United States Patent [19]

Turlakov et al.

[11] Patent Number: 4,845,611
[45] Date of Patent: Jul. 4, 1989

[54] DEVICE FOR CONNECTING 8-BIT AND 16-BIT MODULES TO A 16-BIT MICROPROCESSOR SYSTEM

[75] Inventors: Hristo A. Turlakov; Venelin G. Barbutov; Stefan S. Machev, all of Sofia, Bulgaria

[73] Assignee: DSO "Izot", Sofia, Bulgaria

[21] Appl. No.: 829,756

[22] Filed: Feb. 14, 1986

[30] Foreign Application Priority Data

Feb. 14, 1985 [BG] Bulgaria ................................. 68832

[51] Int. Cl.$^4$ ........................................... G06F 13/40
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,905,023 | 9/1975 | Perpiglia | 364/200 |
| 3,914,747 | 10/1975 | Barnes et al. | 364/200 |
| 4,181,934 | 1/1980 | Marenin | 364/200 |
| 4,494,187 | 1/1985 | Simpson | 364/200 |
| 4,513,390 | 4/1985 | Walter et al. | 364/900 |
| 4,533,992 | 8/1985 | Magar et al. | 364/200 |
| 4,586,131 | 4/1986 | Caudel et al. | 364/200 |
| 4,630,198 | 12/1986 | I-Yuan | 364/200 |

Primary Examiner—Gary V. Harkcom
Assistant Examiner—Randy W. Lacasse

[57] ABSTRACT

A device for connecting 8-bit and 16-bit modules to a 16-bit microprocessor. Primary data inputs and outputs of the 16-bit microprocessor are coupled, through data buffers, to the information inputs and outputs of half of the 8-bit modules and to primary data inputs and outputs, respectively, of the 16-bit modules, while secondary data inputs and outputs of the 16-bit microprocessor are coupled, through data buffers, to the information inputs and outputs of the other half of the 8-bit modules and to the secondary data inputs and outputs, respectively, of the 16-bit modules. On operations requiring word, or two-byte, exchange operation with the 8-bit modules, a control circuit extends operation of the 16-bit microprocessor allowing the 8-bit modules to work on the two-byte word one byte at a time. The 16-bit modules are capable of word exchange with the 16-bit microprocessor by simultaneously using the primary and secondary inputs and outputs thereof.

3 Claims, 3 Drawing Sheets

DEVICE FOR CONNECTING 8-BIT AND 16-BIT MODULES TO A 16-BIT MICROPROCESSOR SYSTEM

BACKGROUND OF THE INVENTION

This invention relates to a device for connecting 8-bit and 16-bit modules to a 16-bit microprocessor system, that finds application in 16-bit microprocessor systems and computers.

There is known a device for connecting a 16-bit microprocessor system to 8-bit modules, which device contains a 16-bit microprocessor system having its primary data inputs and outputs coupled to half of the information inputs and outputs of a primary bidirectional data buffer, while its secondary inputs and outputs are coupled with half of the information inputs and outputs of a secondary bidirectional data buffer. The address outputs of the 16-bit microprocessor system are connected to the information inputs of a unidirectional address buffer having its outputs connected to the address inputs of the 8-bit modules, the information inputs and outputs of the 8-bit modules being connected to the other half of the information inputs and outputs of the primary bidirectional data buffer and the bidirectional switching data buffer. The 16-bit microprocessor primary inputs and outputs are connected to the information outputs of a buffer register, having its information inputs, in turn, coupled with half of the information inputs and outputs of the primary bidirectional data buffer. The output controlling the twin cycle of the 16-bit microprocessor system is connected to the homonymic input of the control circuit, which includes an output for setting wait periods connected to the homonymic input of the 16-bit microprocessor system. The outputs of the control circuit that control the data buffers are connected to the control inputs of the primary bidirectional data buffer, the buffer register, the bidirectional switching data buffer and the secondary bidirectional data buffer. The address modification control output of the control circuit is connected to the control input of an address modification circuit, its address input being, in turn, coupled to the address outputs of the 16-bit microprocessor system, while its address output is connected to the information inputs of the unidirectional address buffer, the outputs of which are connected to the address input of the control circuit, having a control output connected to the control input of the unidirectional address buffer, and a control input for setting additional wait periods is coupled to the homonymic output of the 8-bit modules.

The control circuit includes a unit controlling the twin cycle, the outputs of which are connected to a unit that sets wait periods, a unit controlling the data buffers, and a unit controlling the address buffers.

The unit controlling the twin cycle follows and decodes the type of the transfer operation executed from the 16-bit microprocessor system. The unit for setting wait periods, the unit controlling the address circuits and the address modification circuit are not activated at byte exchange operations. The address fed to the address outputs of the 16-bit microprocessor system is transferred through the unidirectional address buffer to the address inputs of the 8-bit modules unchanged. If the address is even, the primary data inputs and outputs of the 16-bit microprocessor system are coupled to the information inputs and outputs of the 8-bit modules by means of the primary bidirectional data buffer. At an odd address, the information inputs and outputs of the 8-bit modules are coupled to the secondary data inputs and outputs of the 16-bit microprocessor system by means of the bidirectional switching data buffer. At operations with word (two byte) exchange, the unit controlling the twin cycle activates the unit for setting wait periods and the latter places the 16-bit microprocessor system in a "wait" state. This state extends the operation for as many clock periods as are necessary for execution of additional byte exchange cycle. At the same time, the conditions for setting additional wait periods are followed. These conditions are required by the 8-bit modules to accomplish a single cycle of byte exchange. The unit controlling the twin cycle performs its duties by the use of the unit that controls the data buffers, and the unit controlling the address circuits.

During the first cycle, the address from the address outputs of the 16-bit microprocessor system is transferred unchanged through the unidirectional address buffer to the address inputs of the 8-bit modules. At write instructions, the unit controlling the data buffers controls the transfer of the byte placed on the primary data outputs of the 16-bit microprocessor system, to the information inputs of the 8-bit modules. The byte transfer is accomplished through the primary bidirectional data buffer. At read operations, the unit controlling the data buffers provides the storing of the byte that is on the information outputs of the 8-bit modules. The byte is stored in the buffer register after passing through the primary bidirectional data buffer.

The second exchange cycle is completely controlled by the unit controlling the twin cycle. At this cycle, address modification is accomplished in the address modification circuit. This provides selection and handling of the second byte of the word. The modified address is fed through the unidirectional address buffer to the address inputs of the 8-bit modules. During write operations, the unit controlling the data buffers provides the transfer of the byte, from the secondary data outputs of the 16-bit microprocessor system, to the information inputs of the 8-bit modules. The transfer of the byte is accomplished through the bidirectional switching data buffer.

During read operations, the unit controlling the data buffers provides the transfer of a byte from the information outputs of the 8-bit modules, through the bidirectional switching data buffer, to the secondary data inputs of the 16-bit microprocessor system. At the same time, the buffer register moves the data byte, stored in it during the first exchange cycle, to the primary data inputs of the 16-bit microprocessor system. With respect to the 8-bit modules, the information exchange with the 16-bit microprocessor system is accomplished in bytes regardless of the type of the executed operation. The latter may require byte exchange or word exchange.

Disadvantages of the described device are the linear address allocation and the means for word exchange between the 16-bit microprocessor system and only part of the 8-bit modules. Only operations with byte exchange and nonlinear allocation of the addresses are allowed to the other 8-bit modules. These restrictions are imposed by the 16-bit microprocessor system. Another disadvantage of the device is the low rate of word exchange between the 16-bit microprocessor system and the 16-bit modules.

SUMMARY OF THE INVENTION

It is and object of the present invention to provide a device for connecting 8-bit and 16-bit modules to a 16-bit microprocessor system, providing linear allocation of the addresses and means for word exchange of all modules coupled to the 16-bit microprocessor system, as well as means for increasing the rate of word exchange with the 16-bit modules.

The object of the invention is met by providing a device for connecting 8-bit and 16-bit modules to a 16-bit microprocessor system, which device comprises a 16-bit microprocessor, having a primary data inputs and outputs connected to a half of the information inputs and outputs of a primary bidirectional data buffer and to a half of the information inputs and outputs of a bidirectional reverse-switching data buffer, while secondary data inputs and outputs of the 16-bit microprocessor are connected to a half of the information inputs and outputs of a secondary bidirectional data buffer and to a half of the information inputs and outputs of a bidirectional direct switching data buffer. The other half of the information inputs and outputs of the primary bidirectional data buffer, being connected with the other half of the information inputs and outputs of the bidirectional direct-switching data buffer, constitute a primary data inputs and outputs of the 16-bit microprocessor system, to which are coupled the information inputs and outputs of the first half of the 8-bit modules and the primary data inputs and outputs of the 16-bit modules. The other half of the information inputs and outputs of the secondary bidirectional data buffer, being connected with the other half of the information inputs and outputs of the bidirectional reverse-switching data buffer, constitute a secondary data inputs and outputs of the 16-bit microprocessor system, to which are connected the information inputs and outputs of the other half of the 8-bit modules and the secondary data inputs and outputs of the 16-bit modules. The address outputs of the 16-bit microprocessor are connected with the information inputs of a unidirectional address buffer, the outputs of which are connected with the address inputs of the 8-bit and 16-bit modules.

The 16-bit microprocessor primary data inputs are further coupled to the data outputs of a buffer register, having information inputs connected to the half of the information inputs and outputs of the bidirectional primary data buffer. The output of the 16-bit microprocessor, controlling the twin cycle, is connected with the homonymic input of the control circuit having an output for setting wait periods connected with the homonymic input of the 16-bit microprocessor. The control circuit output that controls the address modification, is connected to the address modification circuit, which, in turn, has its address input coupled with the address outputs of the 16-bit microprocessor. The address output of the address modification circuit is connected with the information inputs of the unidirectional address buffer. The address outputs of the unidirectional address buffer constitute the address outputs of the 16-bit microprocessor system, and are connected to the address input of the control circuit, the input for setting additional wait periods of which is connected with the homonymic control outputs of the 8-bit and 16-bit modules.

The control circuit contains a unit controlling the twin cycle. The control outputs of which are coupled to a unit for setting wait periods, a unit controlling the data buffers, and a unit controlling the address circuits. The control inputs of the twin cycle control unit include an interlocking input, connected with the control output of the control interlocking unit, a twin cycle control input of the control circuit and an input for setting additional wait periods of the control circuit. The control inputs of the control interlocking unit are the enable input of the control circuit and the twin cycle control input of the control circuit. The outputs of the data buffers control unit are outputs for selection of the control circuit buffers and are connected with the homonymic inputs of a circuit for control coordination of the data buffers.

The circuit for control coordination of the data buffers comprises a unit for distinction of the 8-bit modules disposition, and a unit for distinction of the module type. The data buffer selection inputs of the circuit for coordination of the data buffers control are information inputs of the unit for distinction of the 8-bit module disposition. The address input of the circuit for coordination of the data buffers control is an information input of the unit for distinction of the module type. The additional outputs for buffer selection of the unit for distinction of the module type are connected to the unit for distinction of the 8-bit module disposition. The control input for distinction of the 8-bit module disposition, being an input of the circuit for coordination of the data buffers control, is connected with the homonymic control outputs of the 8-bit modules and represents a control input of the unit for distinction of the 8-bit module disposition. The control input for distinction of the module type is connected with the homonymic control outputs for module type of all modules, which information inputs and outputs are connected to the data inputs and outputs of the 16-bit microprocessor system. The control outputs of the unit for distinction of the 8-bit modules disposition are outputs for control of the data buffers of the circuit for coordination of the data buffers control and are connected with the control inputs of the data buffers and the buffer register. The control output "ENABLE" of the circuit for coordination of the data buffers control is connected with the homonymic input of the control circuit.

The advantages of the invention are that it allows all modules coupled to the 16-bit microprocessor system to have linear address allocation and means for byte exchange, as well as means for word (two byte) exchange. Another advantage of the invention is that it provides most favorable speed of word exchange between the 16-bit microprocessor system and the 16-bit modules, and facilitates the programming of the 16-bit microprocessor system.

DESCRIPTION OF THE DRAWINGS

The embodiment of the present invention is shown, by way of example, in the accompanying drawings, wherein.

DESCRIPTION OF THE PREFERRED EMBODIMENT

Figure 1:
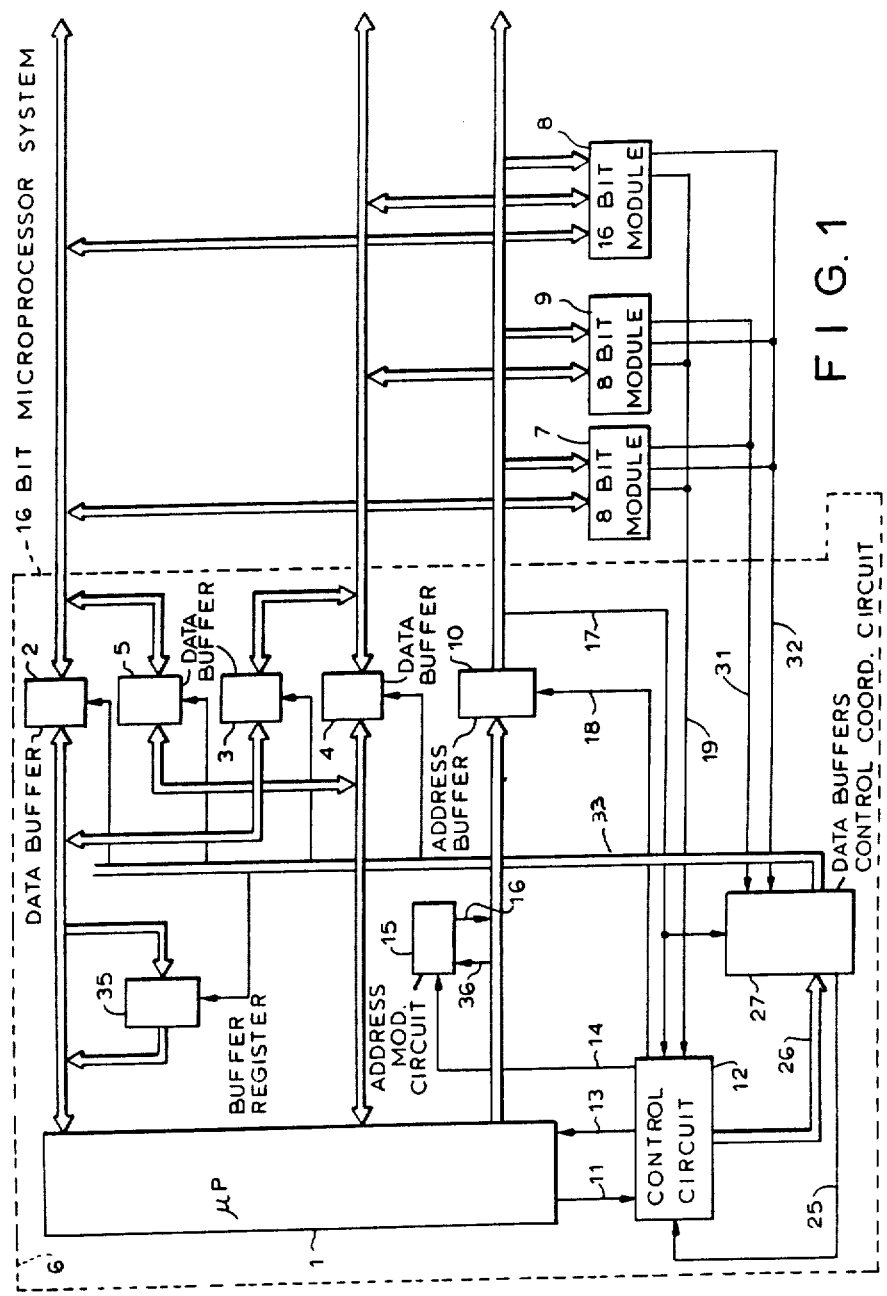
FIG. 1 is a block diagram of the device for connecting 8-bit and 16-bit modules to a 16-bit microprocessor system.
Figure 2:
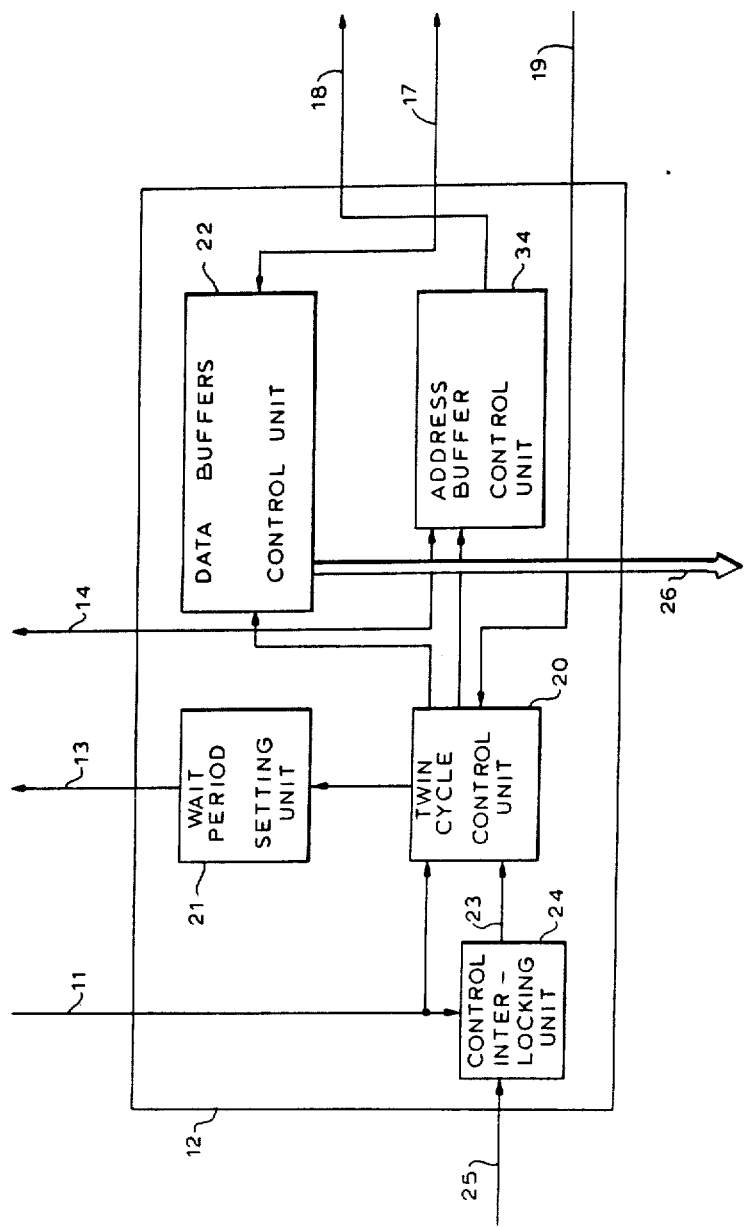
FIG. 2 is a block diagram of a control circuit for the device of FIG. 1.
Figure 3:
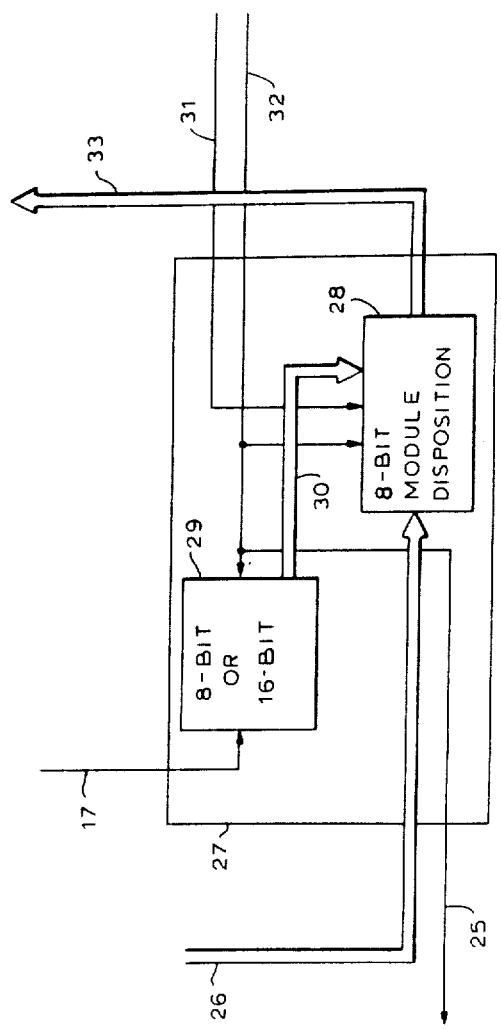
FIG. 3 is a block diagram of a data buffers control coordination circuit for the device of FIG. 1.

According to the invention, the device for connecting 8-bit and 16-bit modules to a 16bit microprocessor system, comprises a 16-bit microprocessor 1, having a primary data inputs and outputs thereof coupled to a half of the information inputs and outputs of a primary bidirectional data buffer 2 and to a half of the information inputs and outputs of a bidirectional reverse-switching data buffer 3. The secondary data inputs and outputs of the 16-bit microprocessor 1 are coupled to a half of the information inputs and outputs of a secondary bidirectional data buffer 4 and to a half of the information inputs and outputs of a bidirectional direct-switching data buffer 5. The other half of the information inputs and outputs of the primary bidirectional data buffer 2 are coupled to the other half of the information inputs and outputs of the bidirectional direct-switching data buffer 5, and constitute the primary data inputs and outputs of a 16-bit microprocessor system 6, to which inputs and outputs are coupled the information inputs and outputs of an 8-bit module 7 and primary data are inputs and outputs of a 16-bit module 8 are. The other half of the information inputs and outputs of the secondary bidirectional data buffer 4 are coupled to the other half of the information inputs and outputs of the bidirectional reverse-switching data buffer 3 and constitute the secondary data inputs and outputs of the 16-bit microprocessor system 6, to which inputs and outputs are coupled the information inputs and outputs of an 8-bit module 9 and the secondary data inputs and outputs of the 16-bit module 8. The address outputs of the 16-bit microprocessor 1 are coupled to the information inputs of a unidirectional address buffer 10, having outputs connected with the address inputs of 8-bit and 16-bit modules 7, 8 and 9.

The primary data inputs and outputs of the 16-bit microprocessor 1 are also coupled to the data outputs of a buffer register 35, which has information inputs coupled to the half of the information inputs and outputs of the primary bidirectional data buffer 2. An output 11 of the 16-bit microprocessor 1, controlling the twin-cycle, is coupled to the homonymic input of a control circuit 12 having an output 13, for setting wait periods, coupled to a control input of the 16-bit microprocessor 1. An address modification control output 14 of the control circuit 12 is connected to an address modification circuit 15, the address input of which is coupled to the address outputs of the 16-bit microprocessor 1. An address output 16 of the address modification circuit 15 is coupled, in turn, to the address inputs of the unidirectional address buffer 10. The address outputs of the unidirectional address buffer 10 are the address outputs of the 16-bit microprocessor system 6 and are also coupled to address input 17 of the control circuit 12. The control circuit 12 has an output 18 connected to the control input of the unidirectional address buffer 12, and an input 19, for setting additional wait periods, connected to the homonymic control outputs of the 8-bit and 16-bit modules 7, 8 and 9.

Control circuit 12 comprises a twin-cycle control unit 20, having control outputs connected to a wait period setting unit 21, a data buffers control unit 22, and an address circuits control unit 34. The control input 23 of the twin-cycle control unit 20 is coupled to the homonymic control output of a control interlocking unit 24, while additional control inputs of the control unit 20 are coupled to the twin-cycle control input 11 of the control circuit 12 and to input 19 of the control circuit 12. Enable input 25 and twin-cycle control input 11 of the control circuit 12 are used as control inputs for the control interlocking unit 24. The outputs of the data buffer control unit 22 are used for the selection of the buffer output 26 of the control circuit 12 and are also coupled to homonymic inputs of the data buffers control coordination circuit 27.

Circuit 27 comprises a unit 28 for distinction of the 8-bit module disposition and a unit 29 for distinction of the module type. The input 26 for buffer selection of the data buffers control coordination circuit 27 are used as information inputs for the unit 28 for distinction of 8-bit module disposition. Address input 17 of circuit 27 is an information input for the unit 29 for distinction of the module type, while additional outputs 30 of the unit 29 are connected to unit 28. A control input for the unit 28 for distinction of 8-bit module disposition, being an input 31 of the circuit 27, is coupled to control outputs of the 8-bit modules 7 and 9. Another control input of the unit 28 is coupled to other control outputs for module type of the 8-bit and 16-bit modules 7, 8 and 9, information inputs and outputs of which are coupled to the information inputs and outputs of the 16-bit microprocessor system 6. The control outputs of unit 28 are also the control outputs 33 of circuit 27 and are coupled to control inputs of the data buffers 2, 5, 3 and 4, and to the control input of the buffer register 35. The enable control output 25 of the circuit 27 is coupled to a homonymic input of the control circuit 12.

The operation of the device for connecting 8-bit and 16-bit modules to a 16-bit microprocessor system, is as follows. The twin-cycle control unit 20 follows and decodes the type of the transfer operation, executed from the 16-bit microprocessor 1. At operations requiring one-byte exchange, the unit 20 does not activate the unit 21, which sets the wait periods. The same relates to unit 34 that controls the address circuits. At byte exchange operation, the address, passed from the address outputs of the 16-bit microprocessor 1, is transferred unchanged through the unidirectional address buffer 10 to the address inputs of the 8-bit and 16-bit modules 7, 8 and 9, i.e. the address modification circuit 15 is not activated.

Unit 22 controls the outputs 26 for selection of the buffers. These outputs 26 are switched to the circuit 27. Circuit 27 controls different groups of bidirectional data buffers depending on the state of the inputs 26 for selection of the buffer, depending also on the state of input 32, used for distinction of the module type, and on the state of input 31, used for distinction of the 8-bit module disposition. If 8-bit module 7, that has its information inputs and outputs coupled to the primary data inputs and outputs of the 16-bit microprocessor system 6, is selected during byte exchange operation, unit 28 allows data to be transferred either through the primary bidirectional data buffer 2 to 8-bit module 7 at an even address of the 8-bit module 7, or through bidirectional direct-switching data buffer 5 at an odd address of the 8-bit module 7. If 8-bit module 9, that has its information inputs and outputs coupled to the secondary data inputs and outputs of the 16-bit microprocessor system 6, is selected during byte exchange operation, unit 28 allows data to be transferred through the secondary bidirectional data buffer 4 to 8-bit module 9 at an even address of the 8-bit module 9, or through bidirectional reverse-switching data buffer 3 at an odd address. If 16-bit module 8 is selected during byte exchange operation, control signal 32 is activated. As a result of that, unit 29 allows data to be transferred through primary bidirectional data buffer 2 if the address of the 16-bit module 8 is even and through the secondary bidirectional data buffer 4 in case of an odd address of the 16-bit module 8. Control signal 31 is set active when the selected 8-bit module is coupled to the secondary data inputs and outputs of the 16-bit microprocessor system 6.

At operations requiring word (two byte) exchange, the twin-cycle control unit 20 activates unit 21 which sets the wait periods. The unit 21 sets the 16-bit microprocessor 1 into a wait state. This state extends the operation of the 16-bit microprocessor 1 for as many periods as are required for the execution of the second additional cycle of byte exchange. Concurrently, the conditions for setting additional wait periods are monitored. The period(s) is required by the 8-bit modules 7 and 9 for execution of a single cycle of byte exchange. Control signal 32 is activated at operations requiring word exchange with 16-bit module 8. In consequence of that, circuit 27 interlocks control circuit 12 by activating its enable output 25 and permits data to be transferred to or from the 16-bit module 8 via the primary bidirectional data buffer 2 and the secondary bidirectional data buffer 4.

During word exchange operation with an 8-bit module the two cycles of byte exchange are executed in a direction determined by the current operation. In the first cycle, the address from the address outputs of the 16-bit microprocessor 1 is passed unchanged through the unidirectional address buffer 10 to the address inputs of the 8-bit and 16-bit modules 7, 8 and 9.

At write operation, unit 22 activates the outputs 26 for selection of the buffer, which outputs 26 are coupled to the data buffers control coordination circuit 27. Data are transferred to the information inputs and outputs of the 8-bit and 16-bit modules 7, 8 and 9 via different bidirectional data buffers depending on the state of the inputs 32 for module type and depending also on the state of the control input 31 of the circuit 27. If the 8-bit module 7 is selected, data are transferred to its information inputs and outputs through the primary bidirectional data buffer 2. If 8-bit module 9 is selected, data are transferred to its information inputs and outputs through bidirectional reverse-switching data buffer 3. At read operation, unit 22 and circuit 27 provide for the storing of the data byte on the information outputs of 8-bit modules 7 and 9 in the buffer register 35. The data byte is stored in the buffer register 35 after it has been passed through the primary bidirectional data buffer 2, in case of the selection of the 8-bit module 7. If the 8-bit module 9 has been selected, the data byte is stored in the buffer register 35 after it has been passed through the bidirectional reverse-switching data buffer 3.

The second exchange cycle is controlled completely by the twin-cycle control unit 20. Address modification is executed in the address modification circuit 15 in the cycle. It provides selection and servicing of the second byte from the word. The modified address is passed through unidirectional address buffer 10 to the address inputs of the 8-bit and 16 -bit modules 7, 8 and 9. In write operation, the data buffers control unit 22 and the data buffers control coordination circuit 27 provide the transfer of the byte that is on the secondary data inputs and outputs of the 16-bit microprocessor 1, to the 8-bit modules through the bidirectional direct-switching data buffer 5 if the 8-bit module 7 is selected. If the 8-bit module 9 is selected, the transfer operation is accomplished through the secondary bidirectional data buffer 4.

In read operation, the data buffers control unit 22 and the data buffers control coordination circuit 27 provide the transfer of the byte that is on the information inputs and outputs of 8-bit modules 7 and 9, to the secondary data inputs and outputs of the 16-bit microprocessor 1 through bidirectional direct-switching data buffer 5, if 8-bit module 7 has been selected. If 8-bit module 9 has been selected, the transfer operation is accomplished through the secondary bidirectional data buffer 4. Concurrently, buffer register 35 feeds the byte, stored in it during the first exchange cycle, to the primary data inputs and outputs of the 16-bit microprocessor 1. In such a way, the 16-bit microprocessor 1 receives the whole word on its information inputs and outputs at the end of the second cycle.

What is claimed is:

1. A device for connecting 8-bit and 16-bit modules to a 16-bit microprocessor, wherein said device comprises:
   a 16-bit microprocessor having information inputs and outputs, and address outputs;
   a primary bidirectional data buffer having information inputs and outputs;
   a bidirectional reverse-switching data buffer having information inputs and outputs;
   a secondary bidirectional data buffer having information inputs and outputs; and
   a bidirectional direct-switching data buffer having information inputs and outputs;
   wherein a primary data inputs and outputs of said 16-bit microprocessor are coupled, respectively, to a half of the information inputs and outputs of said primary bidirectional data buffer and said bidirectional reverse-switching data buffer, respectively, and a secondary data inputs and outputs of said 16-bit microprocessor are coupled, respectively, to a half of the information inputs and outputs of said secondary bidirectional data buffer and said bidirectional direct-switching data buffer, respectively, an other half of the information inputs and outputs of said primary bidirectional data buffer being coupled to an other half of the information inputs and outputs of said bidirectional direct switching data buffer and also constituting a primary set of data inputs and outputs of a 16-bit microprocessor system, and an other half of the information inputs and outputs of said secondary bidirectional data buffer being coupled to an other half of the information inputs and outputs of said bidirectional reverse-switching data buffer and also constituting a secondary set of data inputs and outputs of said 16-bit microprocessor system, said primary set of data inputs and outputs being coupled to information inputs and outputs of a first half of said 8-bit modules and respectively, to a primary data inputs and outputs of said 16-bit modules, and said secondary set of data inputs and outputs being coupled to information inputs and outputs of a second half of said 8-bit modules and, respectively, to a secondary data inputs and outputs of said 16-bit modules;
   said device further comprising:
   a unidirectional address buffer having information inputs coupled to the address outputs of said 16-bit microprocessor, and address outputs, constituting address outputs of said 16-bit microprocessor system, coupled to address inputs, respectively, of said 8-bit and 16-bit modules;
   a buffer register having data outputs coupled to the primary data input and outputs of said 16-bit microprocessor, and information inputs coupled to the half of the information inputs and outputs of said primary bidirectional data buffer;

an address modification circuit having an address input coupled to the address outputs of said 16-bit microprocessor, and an address output coupled to the information inputs of said unidirectional address buffer;

a control circuit having a first input coupled to a control output of said 16-bit microprocessor for receiving a signal indicating two-byte exchange, a second input coupled to homonymic outputs of said 8-bit and 16-bit modules for indicating additional wait periods, a third input coupled to the address outputs of said unidirectional address buffer for indicating word exchange with said 16-bit modules, first output coupled to a wait input of said 16-bit microprocessor, a second output coupled to a control input of said address modification circuit for selectively activating the same, and a third output coupled to said address buffer for controlling the operation thereof; and a data buffers control coordination circuit having a first input coupled to the third input of said control circuit, a second input coupled to said 8-bit modules for distinction of the disposition thereof, a third input coupled to said 8-bit and 16-bit modules for distinguishing between said 8-bit and 16-bit modules, fourth inputs coupled to fourth outputs of said control circuit for receiving signals for selection of said data buffers for the selective actuation thereof, and a second output coupled to said control circuit for enabling said control circuit;

whereby on operations requiring one-byte exchange, the control circuit deactivates said address modification circuit allowing the address from the address outputs of the 16-bit microprocessor to pass unchanged through the address buffer to the 8-bit and 16-bit modules, wherein said data buffers control coordination circuit activates said primary bidirectional data buffer and said bidirectional direct-switching data buffer, respectively, for even and odd addresses of said first half of said 8-bit modules, said secondary bidirectional data buffer and said bidirectional reverse-switching data buffer, respectively, for odd and even addresses of said second half of said 8-bit modules, and said primary and secondary bidirectional data buffers, respectively, for even and odd addresses of said 16-bit modules, and on operations requiring two-byte, or word, exchange with said 16-bit modules, said data buffers control coordination circuit activates both said primary and secondary bidirectional data buffers, while, on operations requiring two-byte, or word, exchange with said 8-bit modules, on a first cycle, said control circuit generates a signal at the first output thereof to set said 16-bit microprocessor in a wait state, and on, on write operations, said data buffers control coordination circuits activates said primary bidirectional data buffer and said bidirectional reverse-switching data buffer for addresses of said first and second halves, respectively, of said 8-bit modules, and on read operations, said control circuit activates said buffer register whereupon the data byte, transferred by said primary bidirectional data buffer and said bidirectional reverse-switching data buffer, respectively, from said first and second halves of said 8-bit modules, is stored therein, and on a second cycle, said control circuit activates said address modification circuit, and on write operations, said data buffers control coordination circuit activates the bidirectional direct-switching data buffer and said secondary bidirectional data buffer, respectively, for said first and second halves of said 8-bit modules, and on read operations, said data buffers control coordination circuit activates said bidirectional direct-switching data buffer and said secondary bidirectional data buffer while, concurrently, said control circuit causes said buffer register to apply the contents thereof to the primary data inputs of said 16-bit microprocessor, whereby said word thereby appears at the primary and secondary, collectively, data inputs of said 16-bit microprocessor.

2. A device as claimed in claim 1, characterized in that said data buffers control coordination circuit comprises a unit for distinction of the module type, and a unit for distinction of the disposition of the 8-bit modules, wherein an address input of said unit for distinction of the module type is coupled to the first input of said data buffers control coordination circuit, said third input being coupled to the second output thereof and to homonymic control inputs of both said unit for distinction of the module type and said unit for distinction of the disposition of the 8-bit modules, said second input being coupled to a control input of said unit for distinction of the disposition of the 8-bit modules, said fourth inputs being coupled to information inputs of said unit for distinction of the disposition of the 8-bit modules, outputs of said unit for distinction of the module type being coupled to additional inputs of said unit for distinction of the disposition of the 8-bit modules, while outputs of the unit for distinction of the disposition of the 8-bit modules are coupled to the first outputs of said data buffers control coordination circuit.

3. A device as claimed in claim 1, characterized in that said control circuit comprises a control interlocking unit having an enable input coupled to an enable input of said control circuit, said first input coupled to the first input of said control circuit and to a homonymic input of a twin-cycle control unit, and said first output being also coupled directly to a homonymic control input of said twin-cycle control unit.

* * * * *